United States Patent
Yamanoi et al.

(10) Patent No.: US 7,145,447 B2
(45) Date of Patent: Dec. 5, 2006

(54) PROMPTING APPARATUS FOR FASTENING SEATBELT

(75) Inventors: Toshimi Yamanoi, Isehara (JP); Nobufumi Shigehara, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 38 days.

(21) Appl. No.: 10/755,227

(22) Filed: Jan. 13, 2004

(65) Prior Publication Data

US 2004/0160339 A1 Aug. 19, 2004

(30) Foreign Application Priority Data

Feb. 14, 2003 (JP) .............. P 2003-036782

(51) Int. Cl.
*B60Q 1/00* (2006.01)
(52) U.S. Cl. .................... 340/457.1; 340/438
(58) Field of Classification Search ........... 340/457.1, 340/457, 457.2, 457.3, 457.4, 964, 438, 425.5
See application file for complete search history.

(56) References Cited

U.S. PATENT DOCUMENTS

| | | | | |
|---|---|---|---|---|
| 4,236,141 A | * | 11/1980 | Terabayashi et al. | 340/457.1 |
| 4,555,690 A | * | 11/1985 | Fukushima et al. | 340/459 |
| 5,760,684 A | * | 6/1998 | Orbach | 340/457.1 |
| 6,278,358 B1 | * | 8/2001 | Spoto et al. | 340/425.5 |
| 6,501,374 B1 | * | 12/2002 | King et al. | 340/457.1 |
| 6,707,391 B1 | * | 3/2004 | Monroe | 340/901 |

FOREIGN PATENT DOCUMENTS

| | | |
|---|---|---|
| JP | 63-192640 | 8/1988 |
| JP | 09-193737 | 7/1997 |
| JP | 2002-211357 A | 7/2002 |

* cited by examiner

*Primary Examiner*—Brent A. Swarthout
(74) *Attorney, Agent, or Firm*—McDermott Will & Emery LLP

(57) ABSTRACT

A prompting apparatus for prompting to fasten a seatbelt for a vehicle, which includes: a detector which detects whether the seatbelt is fastened or unfastened; a warning device which warns that the seatbelt is unfastened and is capable of changing a warning level; and a controller which controls an actuation of the warning device. The controller intensifies a warning level of the warning device in steps in conjunction with a predetermined condition if the vehicle is in motion when the detector has detected that the seatbelt is unfastened.

4 Claims, 5 Drawing Sheets

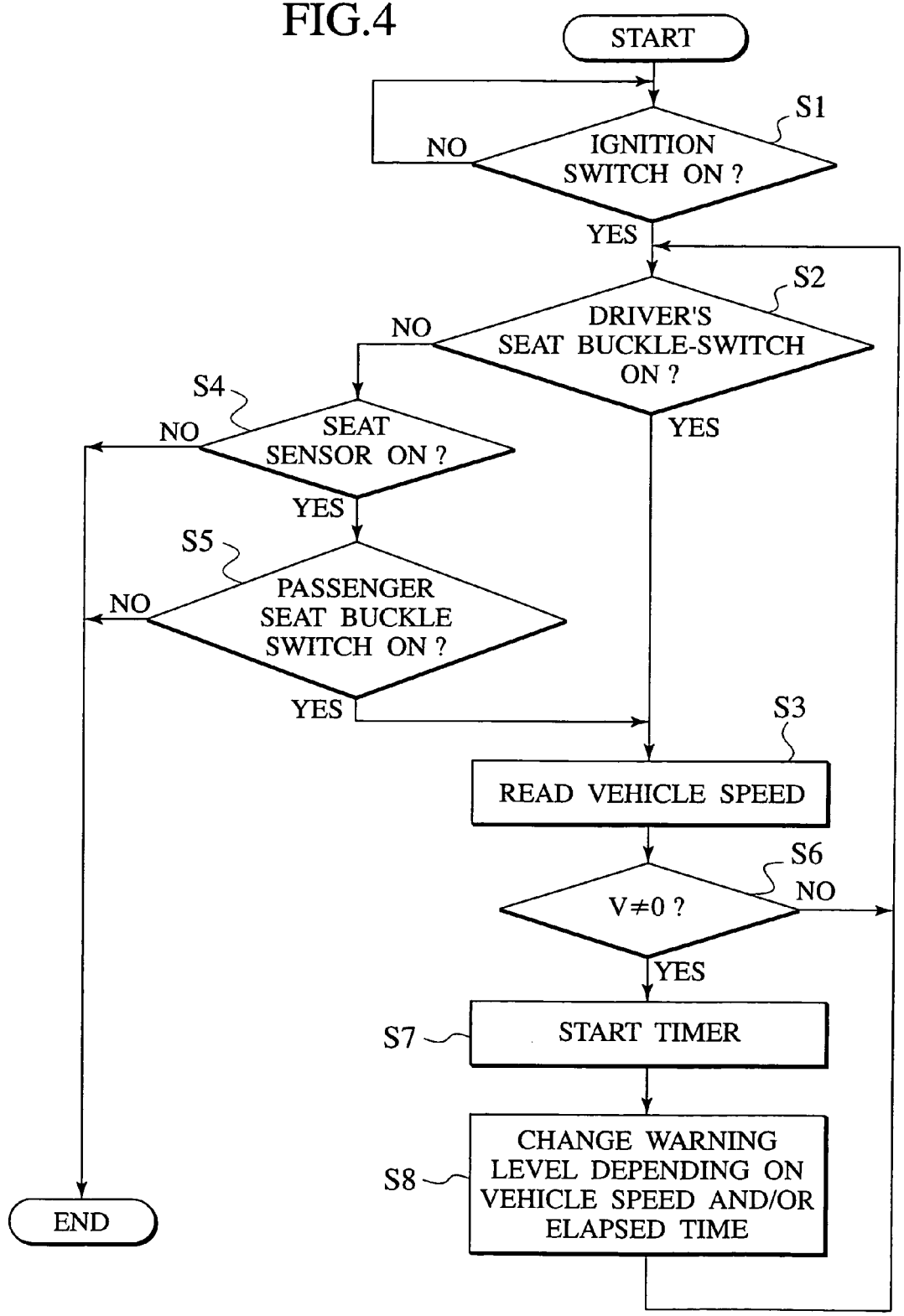

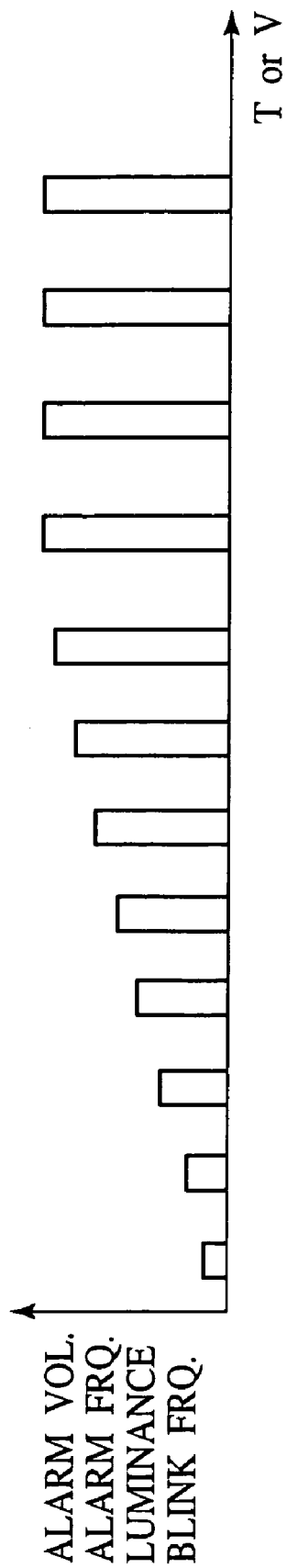
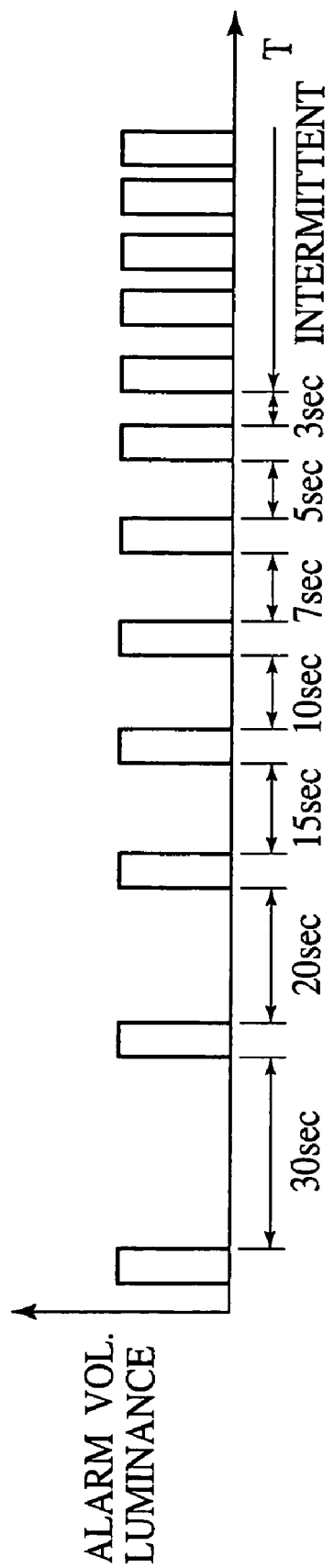

US 7,145,447 B2

PROMPTING APPARATUS FOR FASTENING SEATBELT

BACKGROUND OF THE INVENTION

1. Field of the Invention

The present invention relates to a prompting apparatus for prompting to fasten a seatbelt.

2. Description of Related Art

In general, a warning lamp or the like is provided on an instrument panel for prompting or urging a passenger in a vehicle to pay attention to an unfastened seatbelt. However, the passenger tends to have low alertness regarding fastening the seatbelt because the warning lamp is not highly visible.

Japanese Patent Application Laid-Open No. 2002-211357 discloses an apparatus for prompting a passenger to fasten a seatbelt by a sound warning or warning image display when a vehicle is in motion with the passenger remaining unbelted.

SUMMARY OF THE INVENTION

However, in such a prompting apparatus for prompting to fasten a seatbelt as described above, an unfastening state of the seatbelt is only notified by the sound warning or warning image display, and the passenger in not made to be firmly aware thereof. Consequently, the prompting apparatus does not contribute to improving a seatbelt fastening rate.

The present invention was made in the light of this problem. An object of the present invention is to provide a prompting apparatus for prompting to fasten a seatbelt, which is capable of firmly prompting a passenger to fasten the seatbelt, in which a warning is started based on a predetermined vehicle in motion condition when the seatbelt is unfastened, and a level of discomfort which is caused by the warning and felt by the passenger is increased in steps.

An aspect of the present invention is a prompting apparatus for prompting to fasten a seatbelt of a vehicle, comprising: a detector which detects whether the seatbelt is fastened or unfastened; a warning device which warns that the seatbelt is unfastened, the warning device being capable of changing a warning level; and a controller which controls an actuation of the warning device, wherein the controller intensifies a warning level of the warning device in steps in conjunction with a predetermined condition if the vehicle is in motion when the detector has detected that the seatbelt is unfastened.

BRIEF DESCRIPTION OF THE DRAWINGS

The invention will now be described with reference to the accompanying drawings wherein:

FIG. 4 is a control flowchart of the prompting apparatus for prompting to fasten a seatbelt in FIG. 1;

FIG. 5 is a graph showing an example of a change of a warning level by a warning device in the prompting apparatus for prompting to fasten a seatbelt in FIG. 1; and FIG. 6 is a graph showing another example of the change of the warning level by the warning device in the prompting apparatus for prompting to fasten a seatbelt in FIG. 1.

DETAILED DESCRIPTION OF THE PREFERRED EMBODIMENT

Figure 1:
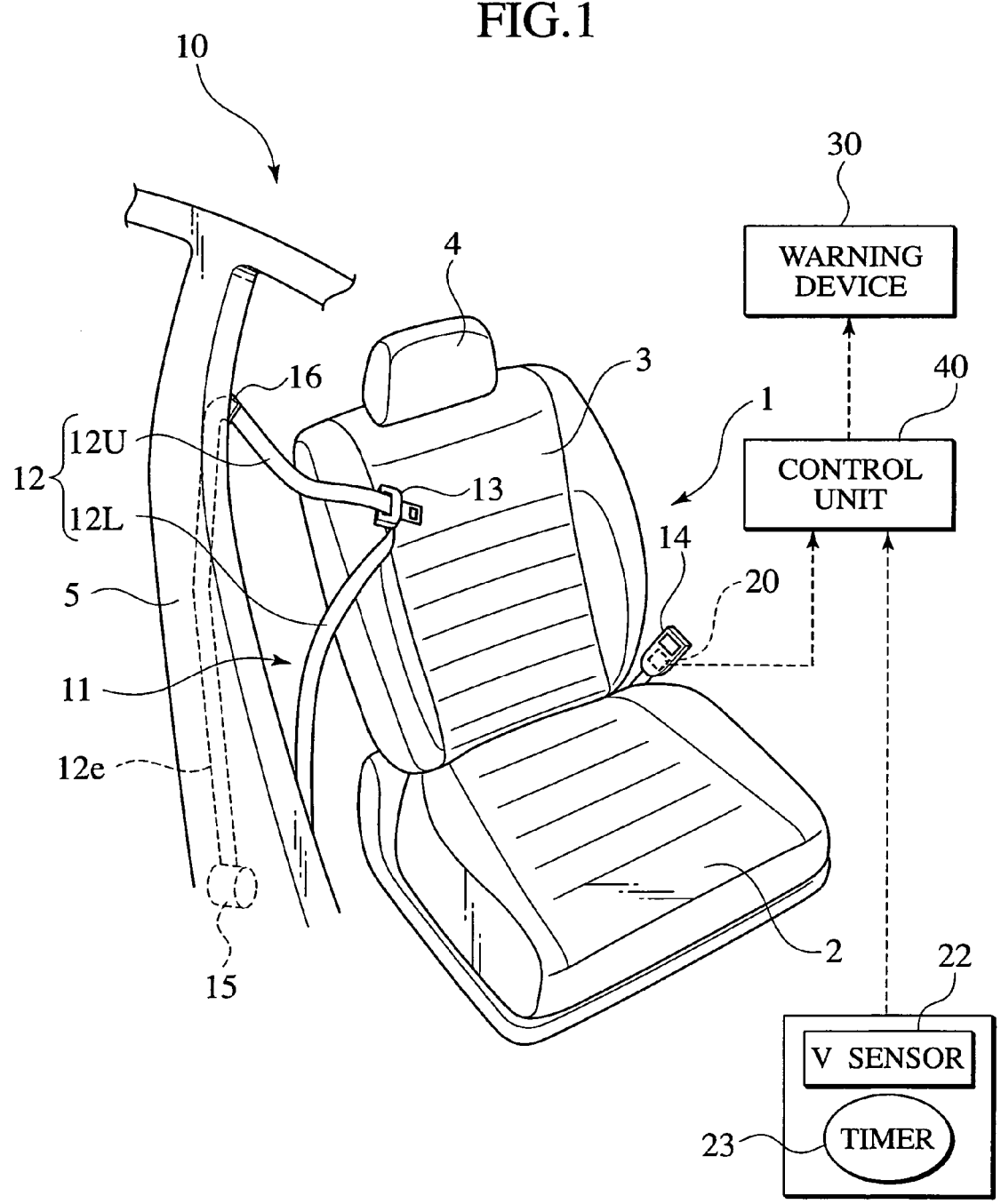
FIG. 1 is a perspective view of a seat and seatbelt of a prompting apparatus for prompting to fasten a seatbelt according to an embodiment of the present invention.

An embodiment of the present invention will be explained below with reference to the drawings, wherein like members are designated by like reference characters.

A seatbelt fastening prompting apparatus 10 of this embodiment is applied to a seatbelt 11 provided in the vicinity of a seat 1 of a vehicle as shown in FIG. 1.

The seat 1 includes a seat cushion 2 and a seat back 3. A headrest 4 is provided on an upper central part of the seat back 3.

The seatbelt 11 includes a webbing 12 which restrains a passenger, a tongue 13 through which the webbing 12 is inserted, and a buckle 14 which detachably attaches the tongue 13 thereto.

One end (upper end in FIG. 1) of the webbing 12 is movably supported on an upper portion of a pillar 5 located in the vicinity of one side (left side in FIG. 1) of the seat back 3. One end of the webbing 12, beyond this supported position, is inserted through the pillar 5 and wound up by and retracted in a retractor 15 housed in the pillar 5. The other end (lower end in FIG. 1) of the webbing 12 is coupled to a lower end of the pillar 5.

When using the seatbelt 11, the tongue 13 is pulled, and thus the webbing 12 is unwound from the retractor 15 and fed out from the pillar 5. Then, the tongue 13 is attached to the buckle 14 provided on a lower end on the other side (right side in FIG. 1) of the seat back 3. In such a way, a portion 12U of the webbing 12, which is on upper side of the tongue 13, restrains the passenger from his/her shoulder diagonally downward, and a portion 12L of the webbing 12, which is on lower side of the tongue 13, restrains the waist of the passenger.

Figure 2:
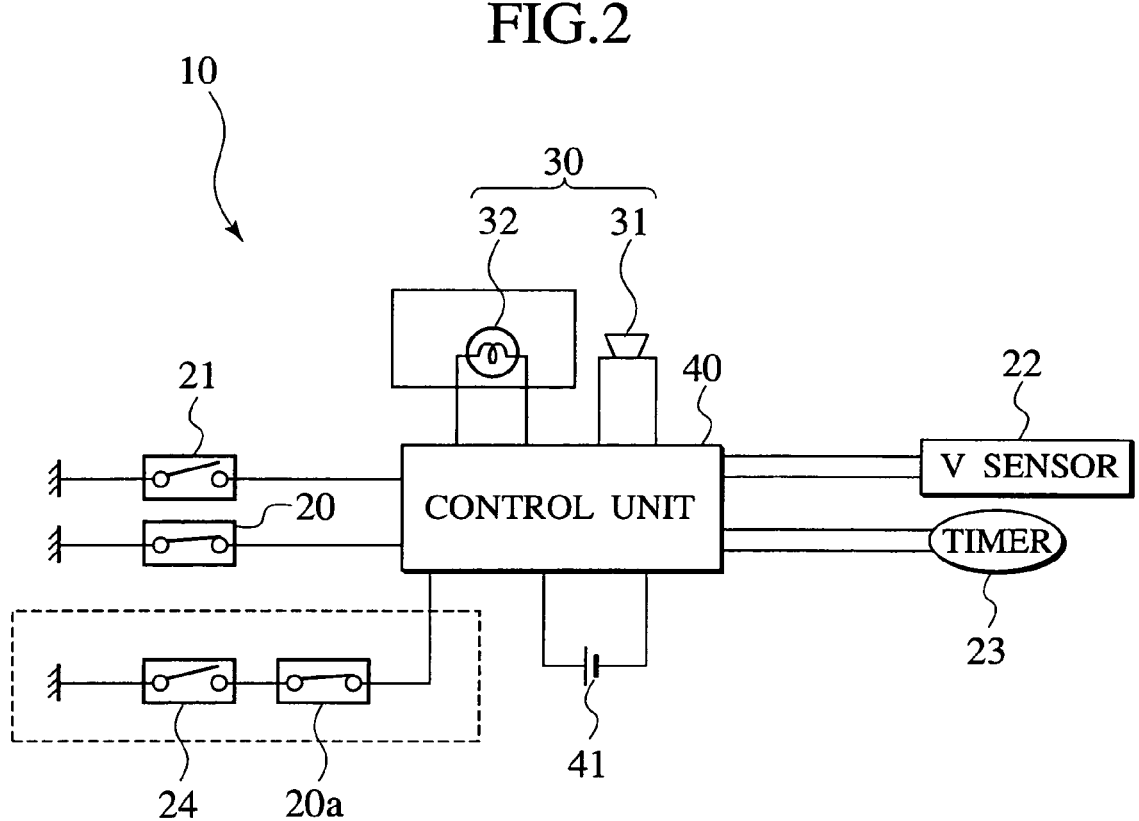
FIG. 2 is a system circuit diagram of the prompting apparatus for prompting to fasten a seatbelt in FIG. 1.

As shown in FIG. 2, the seatbelt fastening prompting apparatus 10 of this embodiment includes a buckle switch 20 as a belt fastening detector which detects whether or not the seatbelt 11 is fastened, a warning device 30 which is capable of warning the passenger that he/she has not fastened the seatbelt 11 and of changing a warning level, and a control unit 40 which actuates the waning device 30 in conjunction with predetermined vehicle in motion conditions and increases the warning level thereof in steps when the vehicle is in motion in a state where the passenger has not fastened the seatbelt 11.

The buckle switch 20 and the warning device 30 are connected to the control unit 40 as shown in FIG. 2. Moreover, an ignition switch 21, a vehicle speed sensor (V sensor) 22, a timer 23, and a battery 41 serving as a power source are connected to the control unit 40.

Figure 3:
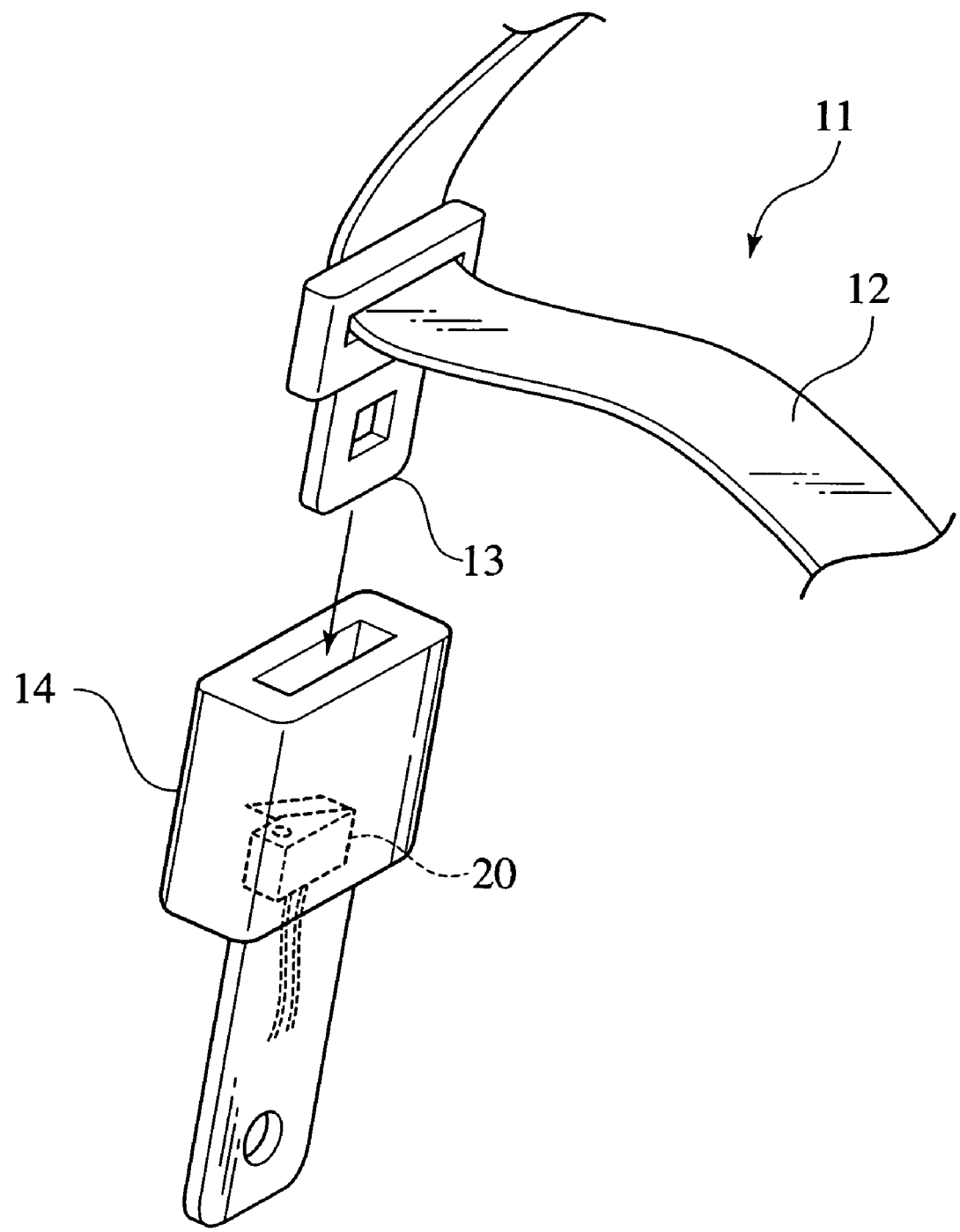
FIG. 3 is a perspective view of a tongue and buckle of the seatbelt in the prompting apparatus for prompting to fasten a seatbelt in FIG. 1, the buckle having a belt fastening detector incorporated therein.

As shown in FIG. 3, the buckle switch 20 is a normal close type switch incorporated in the buckle 14. The buckle switch 20 is turned on in an unfastening state of the seatbelt 11, where the tongue 13 is detached from the buckle 14. On the other hand, the buckle switch 20 is turned off in a fastening state of the seatbelt 11, where the tongue 13 is inserted into the buckle 14 and engaged therewith.

Moreover, in this embodiment, the buckle switch 20 is provided exclusively for a driver's seat. For a passenger's seat, an exclusive buckle switch 20a is provided as shown in FIG. 2. Together with a seating switch 24 which is turned on when a passenger is seated in the passenger's seat, the buckle switch 20a is connected to the control unit 40 in series.

In this embodiment, the warning device 30 is constituted of an alarm buzzer (or a chime) 31 as an alarm sound generator, and of a warning lamp 32. Each of these are buzzer (or chime) 31 and waning lamp 32 is controlled by the control unit 40.

A volume and frequency of the alarm buzzer 31 are variable. The volume and the frequency are changed by control signals from the control unit 40, and thus a warning level of the alarm buzzer 31 is changed.

A luminance and blinking frequency (including a blinking rate) of the warning lamp 32 are variable. The luminance and the blinking frequency are changed by control signals from the control unit 40, and thus a warning level of the warning lamp 32 is changed.

The alarm buzzer 31 is placed in a region where the passenger can hear an alarm sound thereof effectively, for example, in an instrument panel, a vehicle ceiling or the like. The waning lamp 32 is placed in a region where the passenger can visually recognize a display thereof effectively, for example, in the instrument panel, a meter or the like.

The warning device 30 is actuated in conjunction with one of the following conditions being obtained: (1) a vehicle speed is or exceeds a predetermined speed; (2) an elapsed running time, that is, an elapsed time since a start of motion, is or exceeds a predetermined time; and (3) the vehicle speed is or exceeds a predetermined speed and the elapsed running time has or exceeded is or exceeds the predetermined time. Fulfillment of any of these conditions is detected by a signal of the vehicle speed sensor 22, which is supplied to the control unit 40, and by the timer 23 provided in the control unit 40.

Specifically, the control unit 40 executes a control of changing the warning levels of the alarm buzzer 31 and waning lamp 32 when one of the following conditions are met: (1) the vehicle speed has reached 5 Km/h or more; (2) 30 seconds have elapsed since the start of motion; (3) 10 seconds have passed since the vehicle speed reached 10 μm/h or more.

The control process by the control unit 40 is described based on a flowchart of FIG. 4. Note that, in this control process, the fastening states of each of the seatbelts 11 equipped in the driver's and passenger's seats is detected to actuate the warning device 30.

First, it is determined in Step S1 whether or not the ignition switch 21 has been turned on. When the ignition switch 21 has been turned on, it is determined in Step S2 whether or not the buckle switch 20 for the driver's seat is turned on, and thus the fastening state of the seatbelt 11 of the driver's seat is determined.

When the buckle switch 20 is turned on, the driver does not fasten the seatbelt 11, and in this case, the control process proceeds to S3. When the buckle switch 20 is turned off, the driver fastens the seatbelt 11, and in this case, the control process proceeds to Steps S4 and S5, where the fastening state of the seatbelt 11 of the passenger's seat is then determined.

In Step S4, it is determined whether or not the seating switch 24 for the passenger's seat is turned on. When the passenger is seated on the passenger's seat and the switch is turned on, the control process proceeds to Step S5. When the passenger is not seated on the passenger's seat and the switch is turned off, the control process is ended.

When the passenger is seated in the passenger's seat, it is determined in Step S5 whether or not the buckle switch 20a for the passenger's seat is turned on. The fastening state of the seatbelt 11 by the passenger in the passenger's seat is determined, and when the buckle switch 20a is turned on, the passenger in the passenger's seat has not fastened the seatbelt 11. In this case, the control process proceeds to Step S3. When the buckle switch 20a is turned off, the passenger in the passenger's seat has fastened the seatbelt 11. In this case, the control process is ended.

When the driver or the passenger in the passenger's seat has not fastened the respective seatbelt 11, a vehicle speed V is read in Step S3. In the next Step S6, it is determined whether or not the vehicle is in motion (V≈0). When it is determined that the vehicle is stopped (NO, namely, the vehicle speed V is zero), the control process returns to Step S2, and the fastening state of the seatbelt 11 is determined again. When it is determined that the vehicle is in motion (YES, namely, the vehicle speed V is not zero), the timer 23 is actuated in Step S7, and then a control process of changing the warning level depending on the vehicle speed V and an elapsed running time T is performed in Step S8. Thereafter, the above-mentioned control process returns to Step S2, where the fastening state of the seatbelt 11 is determined.

Here, the control process of changing the warning level in Step S8 is performed by the alarm buzzer 31 and the warning lamp 32, which collectively constitute the warning device 30. For example, in the alarm buzzer 31, the volume and frequency of the alarm sound thereof can be changed in steps. In the warning lamp 32, the luminance and blinking frequency can be changed in steps.

In this embodiment, as the elapsed time T elapses or the vehicle speed V rises in the case of vehicle in motion while the seatbelt 11 is unfastened, the volume and frequency of the alarm buzzer 31 and the luminance and blinking frequency of the warning lamp 32 are increased in steps as shown in FIG. 5.

Moreover, the warning level may be changed by shortening an interval of the alarm sounds of the alarm buzzer 31 or a blinking interval of the warning lamp 32 in steps as shown in FIG. 6 as the elapsed running time T elapses.

When the vehicle is driven with the seatbelt 11 remaining unfastened by the driver or the passenger in the passenger's seat, with the above-described configuration, the seatbelt fastening prompting apparatus 10 actuates the alarm buzzer 31 and the warning lamp 32 by the control unit 40 in conjunction with the predetermined vehicle in motion condition, namely, any of the following conditions: (1) the vehicle speed V is or exceeds a predetermined speed; (2) the elapsed running time T is or exceeds a predetermined time; and (3) the vehicle speed T is or exceeds the predetermined speed and the elapsed running time T is or exceeds the predetermined time. Thus, the seatbelt fastening prompting apparatus 10 prompts the passengers to fasten the seatbelts 11.

In this case, even if the impact of the sound and light on the passengers, which are created by the alarm buzzer 31 and the warning lamp 32, are small at the beginning of the warning, the warning levels of these alarm buzzer 31 and warning lamp 32 are increased in steps. Therefore, a discomfort level of the passengers is increased, and thus the passenger is forced to recognize that the seatbelt 11 is not fastened. The passenger fastens the seatbelt 11 without fail in order to escape from this discomfort. Consequently, a fastening rate of the seatbelt 11 can be increased to a great extent.

Moreover, in addition to the above-described operation and effect, as described above, the seatbelt fastening prompting apparatus 10 of this embodiment determines, as the predetermined vehicle in motion condition for actuating the alarm buzzer 31 and the warning lamp 32, any of the following conditions, which are: (1) the vehicle speed V is or exceeds the predetermined speed; (2) the elapsed running time T is or exceeds the predetermined time; and (3) the vehicle speed V is or exceeds the predetermined speed and the elapsed running time T is or exceeds the predetermined time. Therefore, after determining that a current vehicle in motion status is a status where the fastening of the seatbelt 11 is substantially required, a warning can be issued.

Accordingly, when the vehicle is not actually in motion even if the ignition switch 21 is turned on, for example, in the case of idling while the passenger is being seated and taking a rest in an air-conditioned parked vehicle, the alarm buzzer 31 and the warning lamp 32 are prevented from being actuated even if the seatbelt 11 is unfastened.

Moreover, for the waning device 30, the alarm buzzer 31 is used as the alarm sound generator, and the warning level of the alarm buzzer 31 is changed by changing the volume and frequency thereof. Accordingly, the discomfort level of the passenger is increased sufficiently, and the fastening rate of the seatbelt 11 can be increased. The volume of the alarm buzzer 31 in this case is changed from a smaller one to a larger one as shown in FIG. 5 (in this case, an axis of ordinates in FIG. 5 represents the volume). Similarly, the frequency of the alarm buzzer 31 is changed from a lower one to a higher one as shown in FIG. 5 (in this case, the axis of ordinates in FIG. 5 represents the frequency).

Furthermore, for the warning device 30, the warning lamp 32 is used, and the warning level of the warning lamp 32 is changed by changing the luminance and blinking frequency thereof. Accordingly, the discomfort level is increased sufficiently, and the fastening rate of the seatbelt 11 can be increased. The luminance of the warning lamp 32 in this case is changed from a lower one to a higher one as shown in FIG. 5 (in this case, the axis of ordinates in FIG. 5 represents the luminance). Similarly, the blinking frequency of the warning lamp 32 is changed from a smaller one to a larger one as shown in FIG. 5 (in this case, the axis of ordinates in FIG. 5 represents the blinking frequency).

Furthermore, it is possible to change the warning level of the alarm buzzer 31 by shortening the interval of the intermittent alarm sounds as shown in FIG. 6 (in this case, an axis of ordinates in FIG. 6 represents the volume). Similarly, it is possible to change the warning level of the warning lamp 32 by reducing the blinking interval thereof as shown in FIG. 6 (in this case, the axis of ordinates in FIG. 6 represents the luminance).

The preferred embodiment described herein is illustrative and not restrictive, and the invention may be practiced or embodied in other ways without departing from the spirit or essential character thereof.

Although the warning device 30 in this embodiment is provided with both the alarm buzzer 31 and the warning lamp 32, the warning device 30 may only be provided with any one of the alarm buzzer 31 and the warning lamp 32.

Moreover, components of the warning device 30 are not limited to the alarm buzzer 31 or the warning lamp 32, and it is possible to adopt various types of warning tools, for example, a warning image display or a movable warning member as long as such warning tools do not hinder driving, and furthermore, the way of changing the warning level is not limited to the method shown in this embodiment.

Furthermore, though the control process of prompting the fastening of the seatbelts 11 equipped individually in the driver's seat and the passenger's seat has been described, the present invention may be applied only to the seatbelt 11 for the driver's seat. Moreover, the present invention can also be applied to seatbelts equipped in a rear seat.

The scope of the invention being indicated by the claims, and all variations which come within the meaning of claims are intended to be embraced herein.

The present disclosure relates to subject matter contained in Japanese Patent Application No. 2003-036782, filed on Feb. 14, 2003, the disclosure of which is expressly incorporated herein by reference in its entirety.

What is claimed is:

1. A prompting apparatus for prompting to fasten a seatbelt for a vehicle, comprising:
   a detector which detects whether the seatbelt is fastened or unfastened;
   a warning lamp which warns that the seatbelt is unfastened, the warning lamp being capable of changing a warning level;
   a sensor which detects a vehicle speed;
   a timer which measures an elapsed time from a start of motion of the vehicle; and
   a controller which controls an actuation of the warning lamp,
   wherein the controller intensifies a warning level of the warning lamp in steps in conjunction with a predetermined condition when the vehicle is in motion when the detector has detected that the seatbelt is unfastened, and
   wherein the predetermined condition is any of conditions whereby (1) the elapsed time measured by the timer is or exceeds a predetermined time; and (2) the vehicle speed detected by the sensor is or exceeds a predetermined speed and the elapsed time is or exceeds the predetermined time.

2. A prompting method for fastening a seatbelt for a vehicle, comprising:
   detecting whether the seatbelt is fastened or unfastened;
   warning that the seatbelt is unfastened using a warning lamp capable of changing a warning level;
   detecting a vehicle speed; and
   measuring an elapsed time from a start of motion of the vehicle,
   wherein, if the vehicle is in motion when the seatbelt is detected as unfastened, a warning level is intensified in steps in conjunction with any of conditions whereby (1) the measured elapsed time is or exceeds a predetermined time; and (2) the detected vehicle speed is or exceeds a predetermined speed and the measured elapsed time is or exceeds the predetermined time.

3. The prompting apparatus for prompting to fasten a seatbelt according to claim 1,
   wherein the warning level is changed by changing luminance of the warning lamp.

4. The prompting apparatus for prompting to fasten a seatbelt according to claim 1,
   wherein the warning level is changed by changing blinking frequency of the warning lamp.

* * * * *